(12) United States Patent
Ochi et al.

(10) Patent No.: US 7,796,615 B2
(45) Date of Patent: Sep. 14, 2010

(54) SYSTEM AND METHOD FOR COMMUNICATION BETWEEN A PLURALITY OF NETWORKS

(75) Inventors: Ryoichi Ochi, Kanagawa (JP); Yasuomi Ooki, Kanagawa (JP)

(73) Assignee: Nec Infrontia Corporation, Kanagawa (JP)

( * ) Notice: Subject to any disclaimer, the term of this patent is extended or adjusted under 35 U.S.C. 154(b) by 71 days.

(21) Appl. No.: 12/171,320

(22) Filed: Jul. 11, 2008

(65) Prior Publication Data

US 2009/0016367 A1 Jan. 15, 2009

(30) Foreign Application Priority Data

Jul. 12, 2007 (JP) .............................. 2007-183176

(51) Int. Cl.
*H04L 12/28* (2006.01)
(52) U.S. Cl. ....................................... 370/400; 370/401
(58) Field of Classification Search ........................ None
See application file for complete search history.

(56) References Cited

U.S. PATENT DOCUMENTS

| 6,058,431 | A * | 5/2000 | Srisuresh et al. ............ 709/245 |
| 7,480,305 | B1 * | 1/2009 | Somasundaram ........... 370/401 |
| 2003/0065787 | A1 * | 4/2003 | Osafune et al. ............. 709/227 |
| 2004/0243712 | A1 * | 12/2004 | Sakai et al. ................. 709/227 |
| 2005/0105543 | A1 * | 5/2005 | Ikenaga et al. .............. 370/428 |
| 2006/0209855 | A1 * | 9/2006 | Uchida et al. ............... 370/401 |
| 2007/0168551 | A1 * | 7/2007 | Eisink ........................ 709/245 |
| 2008/0133760 | A1 * | 6/2008 | Berkvens et al. ............ 709/228 |
| 2008/0168181 | A1 * | 7/2008 | Berkvens et al. ............ 709/245 |

FOREIGN PATENT DOCUMENTS

| JP | 2004-304318 | 10/2004 |
| JP | 2005-045678 | 2/2005 |

* cited by examiner

*Primary Examiner*—Jayanti K Patel
*Assistant Examiner*—Anthony Sol
(74) *Attorney, Agent, or Firm*—Sughrue Mion, PLLC

(57) ABSTRACT

A communication system for communication between a plurality of networks through a NAPT (Network Address Port Translation) device has communication terminals provided in a local network and a global network, a main device for managing communication information of the communication terminals, and a table provided in the main device for storing identification information, a local address, and a global address of each communication terminal in association with each other. When a communication terminal originates a call, the table is referred to, and when the destination of the call is a communication terminal outside the network, the global address of the NAPT device of the remote network is used as the mutual destination address, whereas when the destination of the call is a communication terminal present in the same network, the local address effective only in the local network is used.

48 Claims, 4 Drawing Sheets

SYSTEM AND METHOD FOR COMMUNICATION BETWEEN A PLURALITY OF NETWORKS

This application is based upon and claims the benefit of priority from Japanese patent application No. 2007-183176, filed on Jul. 12, 2007, the disclosure of which is incorporated herein in its entirety by reference.

BACKGROUND OF THE INVENTION

1. Field of the Invention

The present invention relates to a system and method for communication between a plurality of networks through a NAPT (Network Address Port Translation).

2. Description of the Related Art

The use of a router having a NAT (Network Address Translation) or NAPT (Network Address Port Translation) function enables a plurality of terminals to be connected to a global network using a single global address. On the other hand, when IP telephone or video communication is performed principally in local environments using the network, all the addresses used in such environments are local addresses.

Some of these communication systems exchange their addresses in data using a unique style such as SIP, in addition to the IP's basic field indicating the source and destination. If such a system is expanded to reach a destination beyond the global network, the local address will be contained in the data returned by a terminal receiving the communication since the contents of the data will not be changed by the NAT or the like.

In order to prevent this, several methods are proposed. For example, the NAPT device itself analyzes the contents of data to rewrite the address contained in the data. Alternatively, the terminal itself previously designates the global address of the NAPT device when performing communication.

However, these methods have problems, including the need of modification of the related devices, and heavy load imposed on the NAPT devices.

One of these technologies is described in Japanese Laid-Open Patent Publication No. 2005-45678. This prior art technology provides a communication method which enables direct communication between hosts without altering the NAT function of a router. Specifically, this communication method uses a first router, a first host connected to a network through the first router, a second router, a second host connected to the network through the second router, and a controller connected to the network. The first and second routers have the NAT function and the masquerading function.

Another related technology is described in Japanese Laid-Open Patent Publication No. 2004-304318. The purpose of this technology is for easy communication with other devices through a NAPT device. Specifically, a local communication device uses a service provision device for devices to acquire communication source address port information that is global address port information of a relay device, and exchanges the communication source address port information with a local communication device which it is communicating with. Based on the communication source address port information, the local communication device exchanges an opening request packet by a plurality of methods to search a port openable for communication, and opens and maintains the communication by using an opening/maintenance packet.

SUMMARY OF THE INVENTION

The present invention has been made in view of the problems inherent in the prior art described above, and it is an object of the invention to enable communication between communication terminals located in a plurality of local networks without imposing unnecessary load on NAPT (Network Address Port Translation) devices.

In order to achieve the object describe above, the present invention provides a communication system for communication between a plurality of networks through a NAPT (Network Address Port Translation) device, having: communication terminals provided in a local network and a global network; a main device for managing communication information of the communication terminals; and a table provided in the main device for storing identification information, a local address, and a global address of each of the communication terminals in association with each other. When a communication terminal originates a call, the table is referred to, and if the destination of the originated call is a communication terminal outside the network of the call originating communication table, a global address of the NAPT device of the remote network is used as the mutual destination address, whereas if the destination of the originated call is a communication terminal present in the same network as the call originating communication terminal, a local address that is effective only in the local network is used.

Further, the present invention provides a communication method for communication between a plurality of networks through a NAPT device, and the method is characterized in that: communication terminals are provided in a local network and a global network; communication information of the communication terminals is managed; identification information, a local address, and a global address of each of the communication terminal are stored in association with each other; when a communication terminal originates a call, it is determined whether a remote communication terminal is in the same network or outside the network; if the destination of the originated call is a communication terminal outside the network, a global address of the NAPT device of the remote network is used as the mutual destination address; and if the destination of the originated call is a communication terminal present in the same network, a local address that is effective only in the local network is used.

Further, the present invention provides a communication system for communication between a plurality of networks, having: a first local network having at least two, first and second communication terminals and connected to a first NAPT device; a second local network having at least one, third communication terminal and connected to a second NAPT device; and a global network for connecting the first and second NAPT devices. The first and second communication terminals are respectively assigned with first and second local addresses which are effective only in the first local network. The third communication terminal is assigned with a third local address which is effective only in the second local network. The first and second NAPT devices are respectively assigned with first and second global addresses effective in the global network. The communication system further includes a main device having a table for storing identification information, a local address, and a global address of each of the communication terminals in association with each other, wherein: upon receiving a make-call request from the first communication terminal to make a call to the third communication terminal, the main device determines by referring to the table that the first communication terminal and the third communication terminal belong to different networks and uses the global addresses as the mutual destination addresses, and upon receiving a make-call request from the first communication terminal to make a call to the second communication terminal, the main device determines by referring to the table that the first and second communication terminals belong to the same network and uses the local addresses as the mutual destination addresses.

Preferably, when the main device determines that the first and third communication terminals belong to different networks, the main device creates data to be transmitted to the second NAPT device while using the first global address of the first NAPT device as the source address of the make-call request in the data; and when the third communication terminal responds to the make-call request, the main device creates data to notify the first communication terminal of the response while using the second global address of the second NAPT device as the address of the third communication terminal responding to the communication.

On the other hand, when the main device determines that the first and second communication terminals belong to the same network, the main device uses the first local address of the first communication terminal as the source address of the make-call request to be sent to the second communication terminal; and when the second communication terminal responds to the request, the main device uses the local address of the second communication terminal as the address of the terminal responding to the communication to be sent to the first communication terminal.

The main device is provided, for example in the first local network or in the global network.

Preferably, each of the communication terminals preliminarily transmits data relating to the communication terminal to the main device so that the data is registered in the table of the main device.

Preferably, when receiving a request for registration from a communication terminal, the main device determines whether or not the network corresponding to the address of the communication terminal is the same as the local network which the main device belongs to, and stores the determination result in the table.

Preferably, when a NAPT device is involved in communication between the main device and the communication terminal, the local address of the source of the data is replaced with the global address of the NAPT device before being transmitted to the main device.

Preferably, when the third communication terminal registers itself in the table, the main device receives the global address of the second NAPT device and the local address of the third communication terminal, and stores them in the table.

Preferably, when the first and second communication terminals register themselves in the table, the local addresses of the first and second communication terminals are stored in the table together with the global address of the first NAPT device.

Preferably, when any of the communication terminals performs direct communication with a remote communication terminal, the communication terminal makes an inquiry about the address of the remote communication terminal directly to the main device.

Preferably, when the first communication terminal makes an inquiry to the main device about the address of the third communication terminal, the main device determines whether or not the first communication terminal and the third communication terminal belong to the same network, and if it determines that they belong to different networks, the main device returns the global address of the third communication terminal to the first communication terminal; and upon receiving the global address, the first communication terminal starts communication addressed to the global address.

Preferably, when the first communication terminal makes an inquiry to the main device about the address of the second communication terminal, the main device determines that the first communication terminal and the second communication terminal belong to the same network, and returns the local address of the second communication terminal to the first communication terminal; and upon receiving the local address, the first communication terminal starts communication addressed to the local address.

Preferably, a third NAPT device is additionally provided for connecting from the second local network to the global network, and a fourth communication terminal is additionally provided in the second local network; and each of the communication terminals registers an area ID for uniquely identifying an area which it belongs to when registering itself in the table of the main device.

Preferably, the main device compares the area IDs when determining whether or not the communication terminals belong to the same network.

The area ID is for example t an ID of the local network which each communication terminal belongs to, or an ID of the global network.

Preferably, when the third communication terminal sends to the main device a make-call request for making a call to the fourth communication terminal, the main device determines that the third and fourth communication terminals belong to the same area by comparing their area IDs, and the main device the local address of the third communication terminal as the source address of the make-call request when creating data to be sent to the fourth communication terminal.

Preferably, when receiving a response from the fourth communication terminal, the main device uses the local address of the fourth communication terminal as the address of the terminal responding to the communication in the data sent to the third communication terminal.

According to the present invention as described above, the main device for managing communication information of the communication terminals records networks which the communication terminals belong to when the communication terminals are registered with the main device. When a communication terminal originates a call, the main device determines whether a remote communication terminal is located in the same network as the call originating communication terminal or outside the network. If the call is addressed to a communication terminal outside the network, a global address of the NAPT device of the remote network is used as the mutual destination address. If the call is addressed to a communication terminal present in the same network, a local address is used. This makes it possible for the communication terminal receiving the call to correctly recognize the session originating terminal without imposing unnecessary load on the NAPT device.

According to the present invention, in an environment in which a plurality of local networks are connected to a global network by using a NAT or NAPT device, a communication system for communication between terminals such as telephones operable in a local network can be utilized by a communication terminal located in a different local network in the same manner as by a communication terminal located in the same local network, without any modification of the existing NAT or NAPT device or imposing any unnecessary load on the NAT or NAPT device.

DETAILED DESCRIPTION OF THE INVENTION

Preferred exemplary embodiments of the present invention will be described with reference to the attached drawings.

First Embodiment

Figure 1:
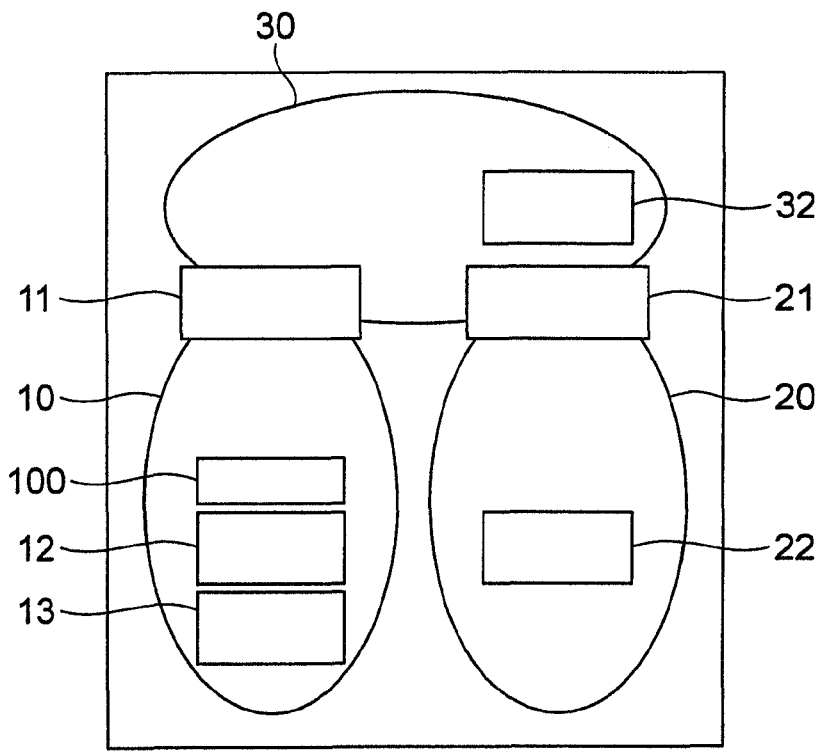
FIG. 1 is a diagram showing configuration of a first embodiment of the present invention.

As shown in FIG. 1, there are a local network 10 and a local network 20, and each of these networks is connected to a global network 30 through its NAT (Network Address Translation) or NAPT (Network Address Port Translation) device (hereafter referred to as the NAPT device) 11, 21. Each of the NAPT device 11 and the NAPT device 21 has a global address used in the global network 30.

A main communication device (hereafter, referred to as the main device) 100 belongs to the local network 10 together with communication terminals 12 and 13. A communication terminal 22 belongs to the local network 20. Each of the main device 100 and the communication terminals 12, 13 and 22 has a local address which is effective only in its associated local network 10 or 20. A communication terminal 32 is directly connected to the global network 30 and has a global address. The communication terminals 12 and 13 and the main device 100 have general telephone exchange PBX functions.

When receiving a registration request from any of the communication terminals 12, 13, 22, 32, the main device 100 has a function to analyze whether or not the address of the requester belongs to the same local network as that of the main device 100 and to record the analysis result. Further, the main device 100 has a function to refer to terminal information in a table to determine whether or not the two terminals to communicate with each other belong to the same network.

There can be stored, in the table, key information that can be uniquely identified, such as extension numbers, IDs, and names of the communication terminals 12, 13, 22, 32, the local addresses and the global addresses of the communication terminals 12, 13, 22, 32. The main device 100 also has a function to rewrite, if necessary, the source address in a connection request data from the communication terminal 12, 13, 22, 32. The local address of the main device 100 is known to the communication terminals 12 and 13 by means of manual setting or with the aid of other means. The global address of the NAPT device 11 is known to the main device 100 and the communication terminals 22 and 32 by means of manual setting or with the aid of other means, as information for connection from other networks to the main device 100 in the local network 10.

Subsequently, description will be made of an operation of the first embodiment.

Figure 2:
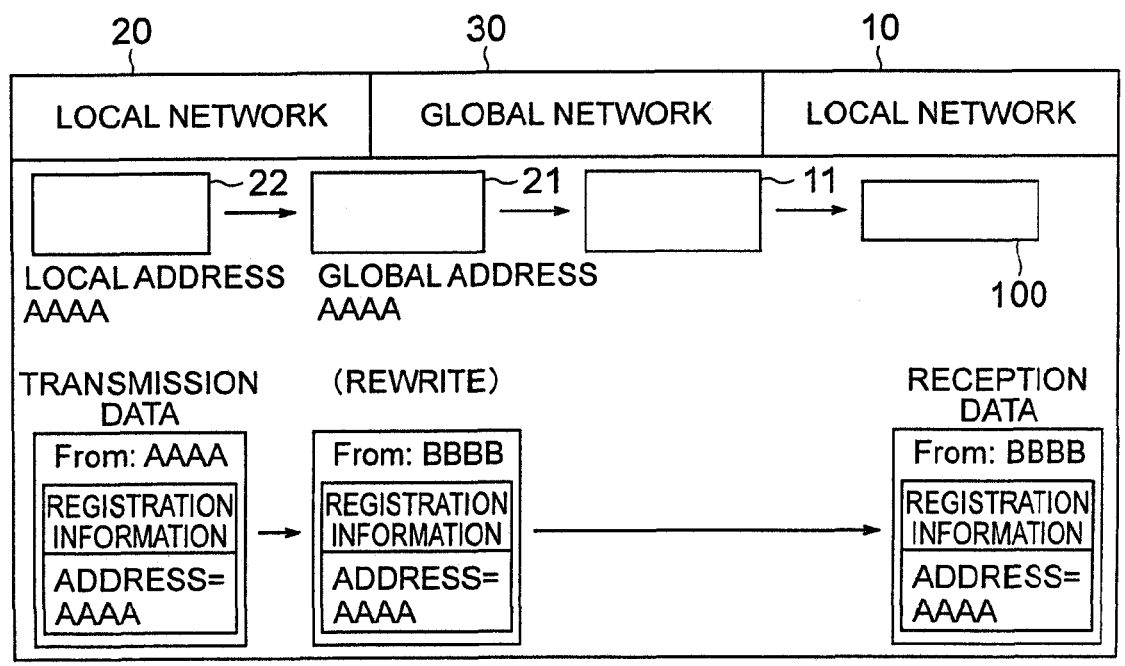
FIG. 2 is a diagram showing operation of registration processing according to the first embodiment of the present invention.

It is requisite for each of the communication terminals 12, 13, 22, 32 to transmit its data for registering itself with the main device 100. When the data communication with the main device 100 for this purpose is performed via the NAPT devices 11, 21 as shown in FIG. 2, the source address of the data is replaced with the address of the NAPT device 11, 21 before reaching the main device 100. When the address of the communication terminal 22 is contained in the data as its registration information, the NAPT devices 11, 21 will not replace the address since the NAPT device does not examine the contents of the data. As a result, the main device 100 is allowed to obtain both the addresses of the NAPT device 21 and of the communication terminal 22 as information of the communication terminal 22.

Thus, the main device 100 stores in the table the address of the communication terminal 22 as the local address and the address of the NAPT device 21 as the global address. On the other hand, the registration requested by the communication terminals 12 and 13 does not involve any NAPT device, the source address remains the same as the address in the data. In this case, the main device 100 is able to determine that the addresses of these communication terminals 12, 13 are the same local address as its own one, and determines that the communication terminals 12, 13 belong to the same network as itself, that is, to the local network 10 of the NAPT device 11. Thus, the main device 100 stores in the table their local addresses together with the global address of the NAPT device 11. Additionally, the registration requested by the communication terminal 32 does not involve any NAPT device, either. Therefore, the main device 100 is able to determine that the source address is the same as the address in the data but is not the local address which the main device 100 itself belongs to. Accordingly, the global address of the communication terminal 32 is stored in the table as both the local address and the global address.

Figure 3:
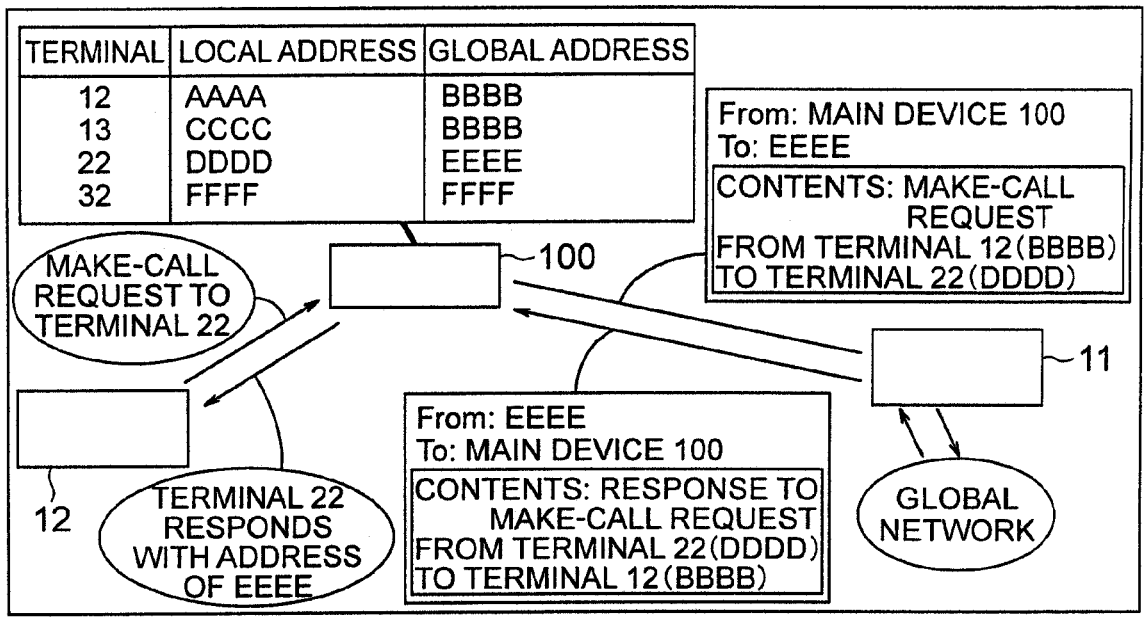
FIG. 3 is a diagram showing operation of call originating processing according to the first embodiment of the present invention.

Description will be made, with reference to FIG. 3, of processing which is performed in the state as described above when the communication terminal 12 issues a make-call request to the main device 100 for the purpose of originating a call to the communication terminal 22.

The main device 100 checks the table for the networks of the communication terminals 12 and 22. In this case, it can be analyzed that the communication terminals 12 and 22 have different global addresses and hence belong to different networks. Accordingly, when generating data to be transmitted to the NAPT device 21, the main device 100 sets the global address of the NAPT device 11 as the address of the source of the make-call request in the data.

When the communication terminal 22 makes a response, the main device 100 generates data to notify the communication terminal 12 of the response, while setting the global address of the NAPT device 21 as the address of the responder to the communication, that is, the communication terminal 22. As a result, the communication terminal 12 and the communication terminal 22 are allowed to mutually recognize a transmittable address from information contained in the data without the need of upper-layer information and hence to communicate with each other via the NAPT devices 11 and 21.

The same is true when the communication terminal 12 tries to originate a call to the communication terminal 32. However, no replacement of addresses occurs at the time when replacing the address of the party responding to the communication, since the addresses to be replaced with each other are the same.

Figure 4:
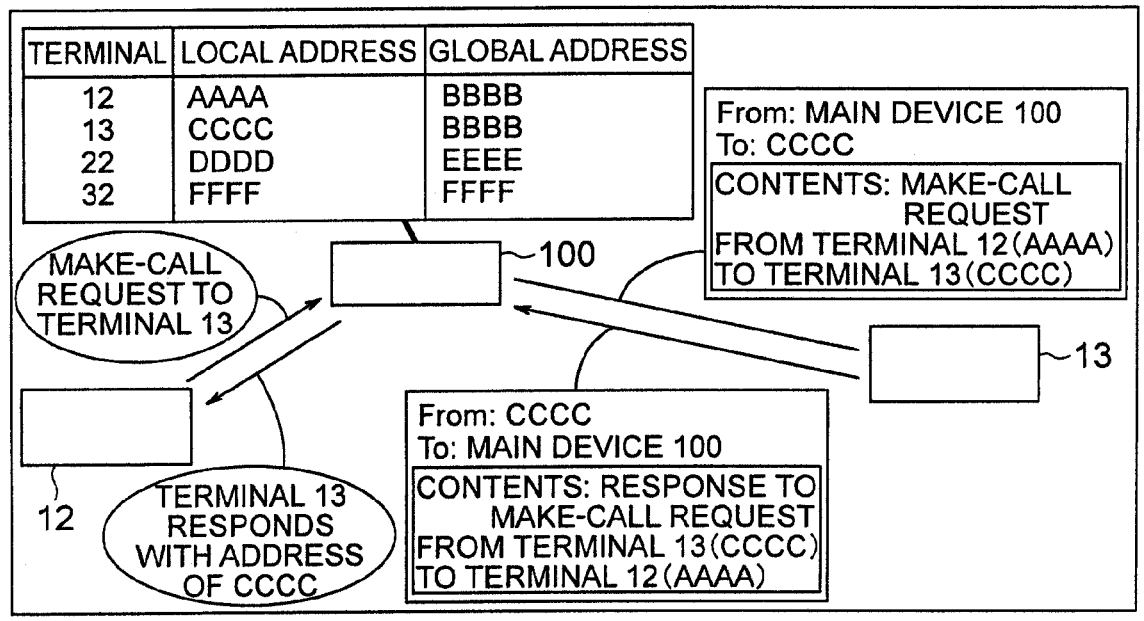
FIG. 4 is a diagram showing operation of another call originating processing according to the first embodiment of the present invention.

Subsequently, processing when the communication terminal 12 originates a call to the communication terminal 13 will be described with reference to FIG. 4.

By analyzing a make-call request received by the main device 100 in the same procedures as described above, it can be determined that the communication terminal 12 and the communication terminal 13 belong to the same network. In this case, the local address of the communication terminal 12 is used as the address the originator of the make-call request sent by the main device 100 to the communication terminal 13. Similarly, when the communication terminal 13 responds to the communication, the local address of the communication terminal 13 is used as the address of the responder to the communication sent to the communication terminal 12.

When the communication terminal 32 tries to originate a call to the communication terminal 12 or the communication terminal 22, the processing is the same as when the communication terminal 12 originates a call to the communication terminal 22, while the call originator address is not replaced since the local address and the global address of the communication terminal 32 are the same.

The first embodiment of the invention enables communication between communication terminals using a unique protocol even if the communication terminals are connected with a NAPT device interposed therebetween. Although there exist several related techniques providing a similar effect, the NAPT device is provided with a function to change the address in the data according to these techniques. According to this embodiment of the invention, in contrast, the NAPT device on the network can be used as it is without any alteration.

Further, according to a convention technique in which communication terminals always use a global address for communication, the destination of these terminals is the global address even after commencement of the communication. Therefore, even when terminals in the same network communicate with each other, a call is once made on the global network and hence a NAPT device is inserted in the communication path. Therefore, even if the NAPT device is able to return the call to the local network based on its own determination, the burden to the NAPT device is increased.

According to the first embodiment, however, these problems can be avoided without adding any sequence, by providing the main device with a capability of discriminating the networks.

Second Embodiment

Figure 5:
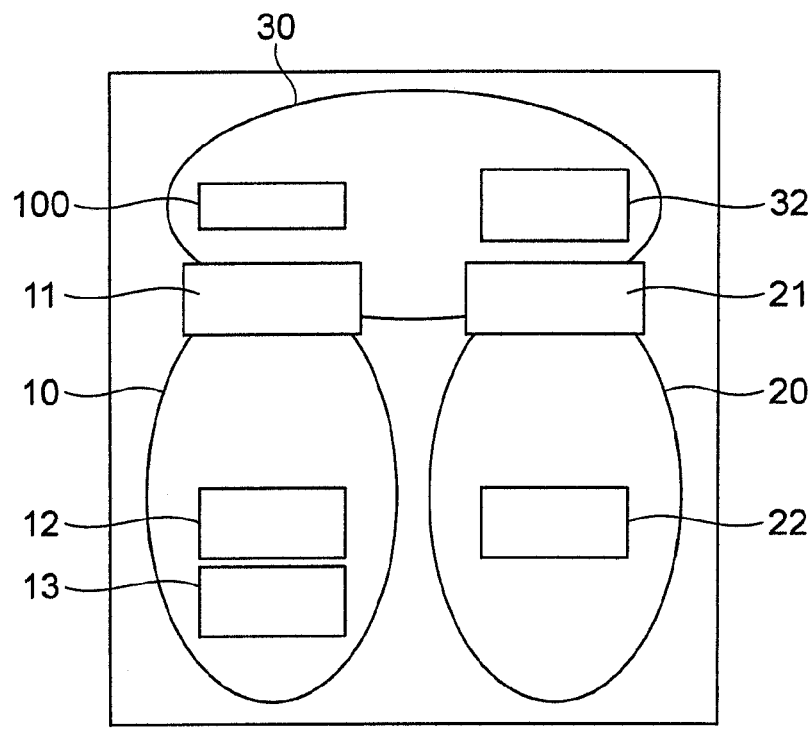
FIG. 5 is a diagram showing configuration of a second embodiment of the present invention.

Whereas, in the first embodiment, the main device 100 is provided in the local network 10, the main device 100 is provided in the global network 30 in this second embodiment as shown in FIG. 5. The other features of the configuration are similar to those of the first embodiment (see FIG. 1), and hence description thereof will be omitted here. In the second embodiment, the global address of the main device 100 is known to all other communication terminal by means of manual setting or with the aid of other means.

Subsequently, description will be made of an operation of the second embodiment.

Features of the operation of the second embodiment are substantially similar to those of the first embodiment, and hence description thereof will be omitted. However, the main device 100 receives the global address of the NAPT device 11 as the source address when the communication terminals 12 and 13 register themselves with the main device, in the same manner as when the communication terminal 22 registers itself. Although the communication terminal 32 belongs to the same global network 30 as the main device 100, the principle of operation remains the same since the local address is the same as the global address.

According to the second embodiment, the same effects as those of the first embodiment can be obtained regardless of where the main device is located on the network. In addition, according to this configuration, it is obvious that the main device 100 need not previously know the address of the NAPT device 11, but it will suffice that the main device 100 is able to identify it when the communication terminal 12 or the communication terminal 13 is registered.

Third Embodiment

System configuration of the third embodiment is similar to that of the first embodiment (see FIG. 1) or the second embodiment (see FIG. 5), and therefore description thereof will be omitted. However, the communication terminals 12, 13, 22, 32 are designed to start communication by transmitting data directly to a remote communication terminal instead of relying on the main device 100 to establish connection with the remote communication terminal.

Subsequently, description will be made of an operation of the third embodiment.

Since registration processing of the third embodiment is similar to that of the first embodiment or the second embodiment, description thereof will be omitted.

When any of the communication terminals 12, 13, 22, 32 makes direct communication with a remote communication terminal, the communication terminal 12, 12, 22, 32 inquires the address of the remote communication terminal instead of issuing a make-call request to the main device 100. For example, if the communication terminal 12 inquires about the address of the communication terminal 22 to the main device 100, the main device 100 determines whether or not the network which the inquiring communication terminal 12 belongs to is the same as the network which the communication terminal 22 whose address is inquired belongs to.

The networks are different in this case. Therefore, the main device 100 returns the global address of the communication terminal 22 to the communication terminal 12. Receiving the global address, the communication terminal 12 starts communication addressed to the global address.

If the communication terminal 12 inquires about the address of the communication terminal 13, the main device 100 determines that the communication terminals 12 and 13 belong to the same network, and thus returns the local address of the communication terminal 13 to the communication terminal 12.

According to the third embodiment, a communication mode which does not require establishment of a two-way path is enabled between networks through a NAPT device. This communication mode can be utilized also when a communication terminal communicates simultaneously with a plurality of other communication terminals.

Fourth Embodiment

Figure 6:
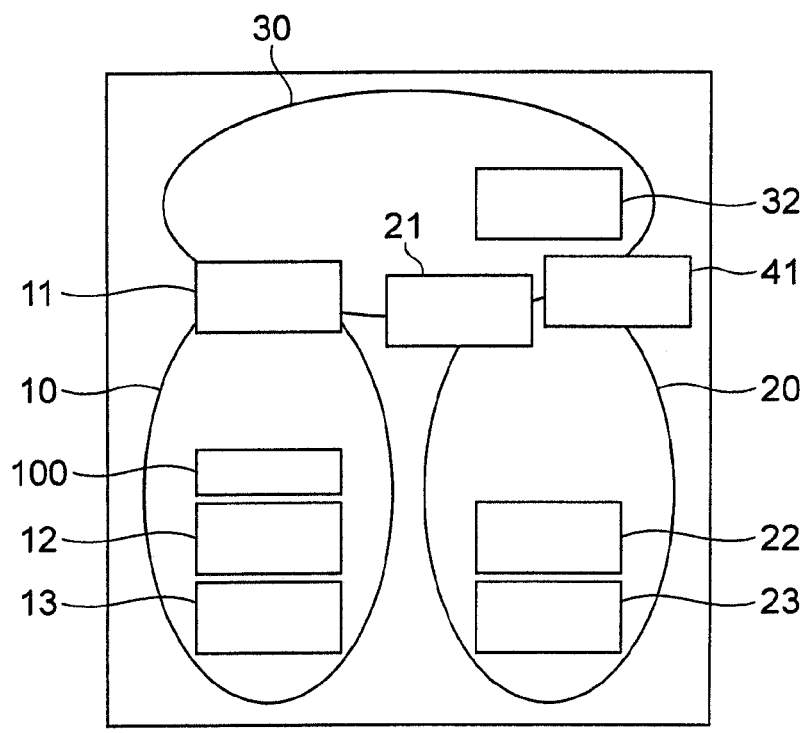
FIG. 6 is a diagram showing configuration of a fourth embodiment of the present invention.

As shown in FIG. 6, a NAPT device 41 connecting the local network 20 to the global network 30 is added to the configuration shown in FIG. 1. A communication terminal 23 is also added in the local network 20. Other features of the configuration are similar to those of the first embodiment (see FIG. 1) and hence description thereof will be omitted.

Figure 7:
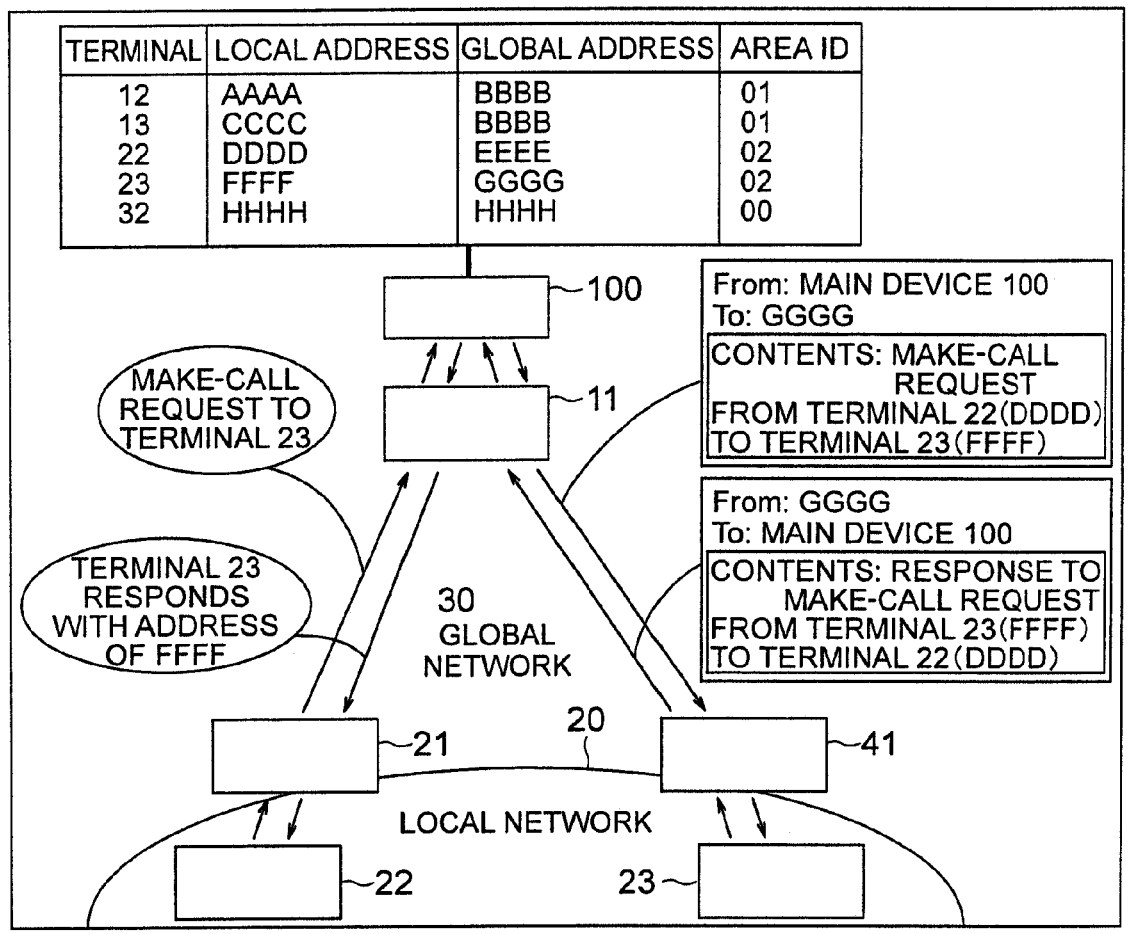
FIG. 7 is a diagram showing operation according to the fourth embodiment of the present invention.

When registering with the main device 100, each of the communication terminals 12, 13, 22, 23, 32 also registers its area ID for uniquely identifying the area which the terminal belongs to. As shown in FIG. 7, the area IDs of the communication terminals 12, 13, 22, 23, 32 are added in the table of the main device 100. When determining whether or not the communication terminals 12, 13, 22, 23, 32 belong to a same network, the main device 100 compares the area IDs instead of the global addresses.

Subsequently, description will be made of an operation of the fourth embodiment.

Principal registration processing of each communication terminal 12, 13, 22, 23, 32 is similar to that of the first embodiment, and therefore description thereof will be omitted. Description will be made of registration processing of area IDs which is different from the registration processing of the first embodiment.

It is assumed, for example, that the communication terminal 23 (see FIG. 6) communicates to the global network 30 via the NAPT device 41 when performing registration. Each of the communication terminals 12, 13, 22, 23, 32 reports its area ID which it belongs to when it registers itself with the main device. As shown in FIG. 7, the communication terminals 12 and 13 register the ID (01) of the local network 10, the communication terminals 22 and 23 register the ID (02) of the local network 20, and the communication terminal 32 registers the ID (00) of the global network 30. The main device 100 stores these area IDs in the table.

When the communication terminal 22 sends a make-call request to the main device 100 for the purpose of originating a call to the communication terminal 23, the main device 100 compares the area IDs of these communication terminals. The main device 100 determines, as a result of the comparison, that the communication terminals belong to the same area network (local network 20) and uses the local address of the communication terminal 22 as the address of the originator of the make-call request when creating data sent to the communication terminal 23. Likewise, when receiving a response from the communication terminal 23, the local address of the communication terminal 23 is used as the responder's address in data sent to the communication terminal 22.

According to the fourth embodiment, there are several paths from a local network to a global network. Even if communication terminals register with the main device using different NAPT devices, the main device is able to determine that the communication terminals belong to the same network as long as the area IDs are the same. This makes it possible for the communication terminals to perform communication using only the local addresses, and eliminates the load that is otherwise incurred to NAPT devices involved in the communication.

Fifth Embodiment

Figure 8:
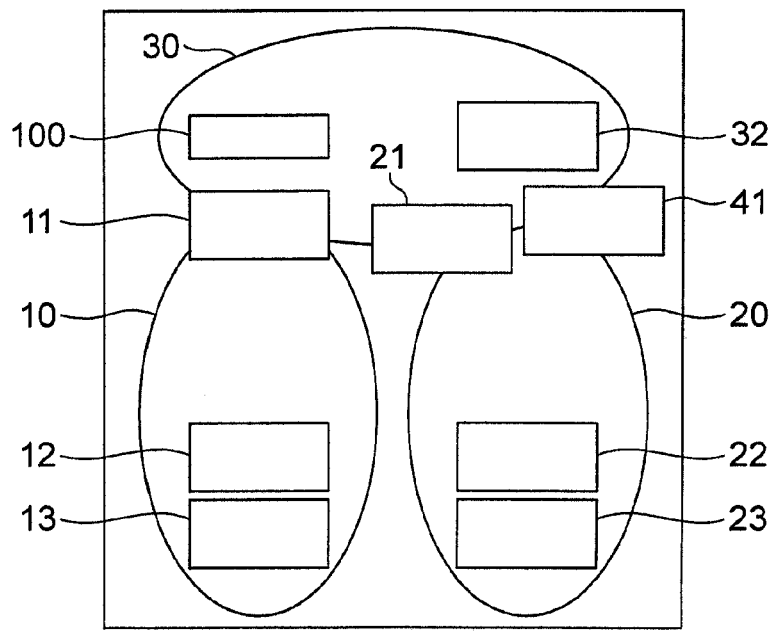
FIG. 8 is a diagram showing configuration of a fifth embodiment of the present invention.

As shown in FIG. 8, the fifth embodiment has a similar configuration to that of the fourth embodiment (see FIG. 6) except that the main device 100 of FIG. 6 is located in the global network 30, and therefore description thereof will be omitted. The global address of the main device 100 is known to all other communication terminals by means of manual setting or with the aid of other means.

Subsequently, description will be made of an operation of the fifth embodiment.

Operation of the fifth embodiment is similar to that of the fourth embodiment and hence description thereof will be omitted. However, when the communication terminals 12 and 13 perform registration, the address of the NAPT device 11 is sent to the main device as the source address in the same manner as when the communication terminal 22 performs registration.

According to the fifth embodiment, the same effects as those of the fourth embodiment can be obtained regardless of where the main device is located on the network. It is obvious that, according to this configuration, the main device 100 is not required to previously know the address of the NAPT device 11, but only to know the same when registering the communication terminal 12 or communication terminal 13.

Sixth Embodiment

Configuration of the sixth embodiment is similar to that of the fourth or fifth embodiment. Therefore, description thereof will be omitted. However, each of the communication terminal 12, 13, 22, 23, 32 starts communication by directly sending data to a remote communication terminal instead of relying on the main device 100 for connection to the remote communication terminal.

Subsequently, description will be made of an operation of the sixth embodiment.

Registration processing of the sixth embodiment is similar to that of the fourth or fifth embodiment. Therefore, description thereof will be omitted.

When the communication terminal 12, 13, 22, 23, 32 performs direct communication with a remote communication terminal, the communication terminal 12, 13, 22, 23, 32 inquires to the main device 100 about the address of the remote communication terminal instead of sending a make-call request.

For example, when the communication terminal 12 inquires to the main device 100 about the address of the communication terminal 22, the main device determines, based on the area IDs, whether or not the communication terminal 12 originating the inquiry belongs to the same network as the communication terminal 22 whose address is inquired. In this case, since these communication terminals belong to different networks, the main device 100 returns the global address of the communication terminal 22 to the communication terminal 12. Receiving the global address, the communication terminal 12 starts communication addressed to the global address.

When the communication terminal 22 inquires about the address of the communication terminal 23, the main device 100 determines that the communication terminals 22 and 23 belong to the same network (local network 20) based on their area IDs, and returns local address of the communication terminal 23 to the communication terminal 22.

According to the sixth embodiment, like the third embodiment, a communication mode which does not require establishment of a two-way path is enabled between networks involving a NAPT device. This communication mode can be used when a communication terminal communicates simultaneously with a plurality of communication terminals.

Seventh Embodiment

Since the seventh embodiment has similar configuration to that of the first, second, third, fourth, fifth or sixth embodiment, description thereof will be omitted.

However, each communication terminal 12, 12, 22, 23, 32 has a function to designate a global address of a NAPT device 11, 21, 41 to use itself as a default gateway as registration information in registration thereof. The main device 100 stores the received information in the table as the global addresses of the communication terminals.

When a communication terminal belonging to the same local network as the main device 100 omits designation of a global address in the state in which there is a field for area IDs in the table, and if a global address of a communication terminal belonging to the same area as that communication terminal has been designated in the table, the main device 100 may use this global address.

If a global address in information registered from a different network is different from the source address of the received data, the main device 100 may determine that the communication terminal has made a setting error and may perform a some kind of error processing.

Subsequently, description will be made of an operation of the seventh embodiment.

Since operation of the seventh embodiment is similar to that of the first, second, third, fourth, fifth, or sixth embodiment, description thereof will be omitted. However, when registering, each of the communication terminals 12, 13, 22, 23, 32 notifies its own global address in registration information, and the main device 100 stores the same in the table.

Effects of the seventh embodiment are similar to those of the first, second, third, fourth, fifth, or sixth embodiment, and hence description thereof will be omitted.

Further, since a NAPT device to be used can be designated in registration information, the main device is able to receive the global address even if the source of received data cannot be known for a reason of configuration of the main device.

Eighth Embodiment

Since the eighth embodiment has similar configuration to that of the fourth, fifth, or sixth embodiment, description thereof will be omitted.

However, the communication terminals 12, 13, 22, 23 and 32 may be designed to have similar functions to those of the seventh embodiment. The main device 100 has a function to prepare global addresses corresponding to the area IDs in the table before registration of the communication terminals 12, 13, 22, 23 and 32. These addresses to be prepared can be changed. If a global address corresponding to an area ID of registration information received from a different network is different from the source address of the received data or the global address in the registration information, the main device 100 may store the information of the communication terminals 12, 13, 22, 23, 32 prior to others, or may determine that some setting error is present in the communication terminals 12, 13, 22, 23, 32 and perform processing to correct such error.

Subsequently, description will be made of an operation of the eighth embodiment.

Since operation of the eighth embodiment is similar to that of the fourth, fifth, or sixth embodiment, description thereof will be omitted.

The processing of the seventh embodiment may be included in processing of registration information of the communication terminals. Once the area IDs of the communication terminal are stored in the table on the main device 100, the global addresses thereof are automatically defined. Therefore, the main device 100 is only required to check whether or not the address matches the registered source address or the global address in the registration information.

Since effects of the eighth embodiment are similar to those of the fourth, fifth, or sixth embodiment, description thereof will be omitted.

Further, according to the eighth embodiment, NAPT devices to be used by communication terminals can be set preliminarily. Therefore, the registration processing of the communication terminals can be omitted.

Further, in the same manner as in the seventh embodiment, the main device is able to identify the global address even if the source of received data cannot be known for a reason of configuration thereof.

Although this invention has been described in conjunction with a few preferred embodiments thereof, this invention is not limited to the foregoing embodiments but may be modified in various other manners within the scope of the appended claims.

What is claimed is:

1. A communication system for communication between a plurality of networks, comprising:
a first local network having at least two, first and second communication terminals and connected to a first Network Address Port Translation (NAPT) device;
a second local network having at least one, third communication terminal and connected to a second NAPT device; and
a global network for connecting the first and second NAPT devices,
the first and second communication terminals being respectively assigned with first and second local addresses which are effective only in the first local network,
the third communication terminal being assigned with a third local address which is effective only in the second local network,
the first and second NAPT devices being respectively assigned with first and second global addresses effective in the global network,
the communication system further comprising:
a main device having a table for storing identification information, a local address, and a global address of each of the communication terminals in association with each other, wherein:
upon receiving a make-call request from the first communication terminal to make a call to the third communication terminal, the main device determines by referring to the table that the first communication terminal and the third communication terminal belong to different networks and uses the global addresses as mutual destination addresses; and
upon receiving a make-call request from the first communication terminal to make a call to the second communication terminal, the main device determines by referring to the table that the first and second communication terminals belong to the same network and uses the local addresses as mutual destination addresses,
wherein:
when the main device determines that the first and third communication terminals belong to different networks, the main device creates data to be transmitted to the second NAPT device while using the first global address of the first NAPT device as a source address of the make-call request in the data; and
when the third communication terminal responds to the make-call request, the main device creates data to notify the first communication terminal of that response while using the second global address of the second NAPT device as a address of the third communication terminal responding to the communication.

2. The communication system for communication between a plurality of networks according to claim 1, wherein:
when the main device determines that the first and second communication terminals belong to the same network, the main device uses the first local address of the first communication terminal as the source address of the make-call request to be sent to the second communication terminal; and when the second communication terminal responds to the request, the main device uses the local address of the second communication terminal as the address of the terminal responding to the communication to be sent to the first communication terminal.

3. The communication system for communication between a plurality of networks according to claim 1, wherein the main device is provided in the first local network.

4. The communication system for communication between a plurality of networks according to claim 1, wherein the main device is provided in the global network.

5. The communication system for communication between a plurality of networks according to claim 1, wherein each of the communication terminals preliminarily transmits data relating to the communication terminal to the main device so that the data is registered in the table of the main device.

6. The communication system for communication between a plurality of networks according to claim 5, wherein when receiving a request for registration from a communication terminal, the main device determines whether or not the network corresponding to the address of the communication terminal is the same as the local network which the main device belongs to, and stores the determination result in the table.

7. The communication system for communication between a plurality of networks according to claim 6, wherein when a NAPT device is involved in communication between the main device and the communication terminal, the local address of the source of the data is replaced with the global address of the NAPT device before being transmitted to the main device.

8. The communication system for communication between a plurality of networks according to claim 6, wherein when the third communication terminal registers itself in the table, the main device receives the global address of the second NAPT device and the local address of the third communication terminal, and stores the global address and the local address in the table.

9. The communication system for communication between a plurality of networks according to claim 6, wherein when the first and second communication terminals register themselves in the table, the local addresses of the first and second communication terminals are stored in the table together with the global address of the first NAPT device.

10. The communication system for communication between a plurality of networks according to claim 1, wherein when any of the communication terminals performs direct communication with a remote communication terminal, the communication terminal makes an inquiry about the address of the remote communication terminal directly to the main device.

11. The communication system for communication between a plurality of networks according to claim 10, wherein:

when the first communication terminal makes an inquiry to the main device about the address of the third communication terminal, the main device determines whether or not the first communication terminal and the third communication terminal belong to the same network, and if it determines that the first communication terminal and the third communication terminal belong to different networks, the main device returns the global address of the third communication terminal to the first communication terminal; and upon receiving the global address, the first communication terminal starts communication addressed to the global address.

12. The communication system for communication between a plurality of networks according to claim 10, wherein:

when the first communication terminal makes an inquiry to the main device about the address of the second communication terminal, the main device determines that the first communication terminal and the second communication terminal belong to the same network, and returns the local address of the second communication terminal to the first communication terminal; and upon receiving the local address, the first communication terminal starts communication addressed to the local address.

13. The communication system for communication between a plurality of networks according to claim 1, wherein:

a third NAPT device is additionally provided for connecting from the second local network to the global network, and a fourth communication terminal is additionally provided in the second local network; and each of the communication terminals registers an area ID for uniquely identifying an area which it belongs to when registering itself in the table of the main device.

14. The communication system for communication between a plurality of networks according to claim 13, wherein the main device compares the area IDs when determining whether or not the communication terminals belong to the same network.

15. The communication system for communication between a plurality of networks according to claim 13, wherein the area ID is an ID of the local network which each communication terminal belongs to, or an ID of the global network.

16. The communication system for communication between a plurality of networks according to claim 13, wherein when the third communication terminal sends to the main device a make-call request for making a call to the fourth communication terminal, the main device determines that the third and fourth communication terminals belong to the same area by comparing their area IDs, and the main device uses the local address of the third communication terminal as the source address of the make-call request when creating data to be sent to the fourth communication terminal.

17. The communication system for communication between a plurality of networks according to claim 16, wherein when receiving a response from the fourth communication terminal, the main device uses the local address of the fourth communication terminal as the address of the terminal responding to the communication in the data sent to the third communication terminal.

18. A communication system for communication between a plurality of networks, comprising:

a first local network having at least two, first and second communication terminals and connected to a first Network Address Port Translation (NAPT) device;

a second local network having at least one, third communication terminal and connected to a second NAPT device; and a global network for connecting the first and second NAPT devices, the first and second communication terminals being respectively assigned with first and second local addresses which are effective only in the first local network, the third communication terminal being assigned with a third local address which is effective only in the second local network, the first and second NAPT devices being respectively assigned with first and second global addresses effective in the global network, the communication system further comprising:

a main device having a table for storing identification information, a local address, and a global address of each of the communication terminals in association with each other, wherein:

upon receiving a make-call request from the first communication terminal to make a call to the third communication terminal, the main device determines by referring to the table that the first communication terminal and the third communication terminal belong to different networks and uses the global addresses as mutual destination addresses; and upon receiving a make-call request from the first communication terminal to make a call to the second communication terminal, the main device determines by referring to the table that the first and second communication terminals belong to the same network and uses the local addresses as mutual destination addresses, wherein:

when the main device determines that the first and second communication terminals belong to the same network, the main device uses the first local address of the first communication terminal as the source address of the make-call request to be sent to the second communication terminal; and when the second communication terminal responds to the request, the main device uses the local address of the second communication terminal as the address of the terminal responding to the communication to be sent to the first communication terminal.

19. The communication system for communication between a plurality of networks according to claim 18, wherein the main device is provided in the first local network.

20. The communication system for communication between a plurality of networks according to claim 18, wherein the main device is provided in the global network.

21. The communication system for communication between a plurality of networks according to claim 18, wherein each of the communication terminals preliminarily transmits data relating to the communication terminal to the main device so that the data is registered in the table of the main device.

22. The communication system for communication between a plurality of networks according to claim 21, wherein when receiving a request for registration from a communication terminal, the main device determines whether or not the network corresponding to the address of the communication terminal is the same as the local network which the main device belongs to, and stores the determination result in the table.

23. The communication system for communication between a plurality of networks according to claim 22, wherein when a NAPT device is involved in communication between the main device and the communication terminal, the local address of the source of the data is replaced with the global address of the NAPT device before being transmitted to the main device.

24. The communication system for communication between a plurality of networks according to claim 22, wherein when the third communication terminal registers itself in the table, the main device receives the global address of the second NAPT device and the local address of the third communication terminal, and stores the global address and the local address in the table.

25. The communication system for communication between a plurality of networks according to claim 22, wherein when the first and second communication terminals register themselves in the table, the local addresses of the first and second communication terminals are stored in the table together with the global address of the first NAPT device.

26. The communication system for communication between a plurality of networks according to claim 18, wherein when any of the communication terminals performs direct communication with a remote communication terminal, the communication terminal makes an inquiry about the address of the remote communication terminal directly to the main device.

27. The communication system for communication between a plurality of networks according to claim 26, wherein:

when the first communication terminal makes an inquiry to the main device about the address of the third communication terminal, the main device determines whether or not the first communication terminal and the third communication terminal belong to the same network, and if it determines that the first communication terminal and the third communication terminal belong to different networks, the main device returns the global address of the third communication terminal to the first communication terminal; and upon receiving the global address, the first communication terminal starts communication addressed to the global address.

28. The communication system for communication between a plurality of networks according to claim 26, wherein:

when the first communication terminal makes an inquiry to the main device about the address of the second communication terminal, the main device determines that the first communication terminal and the second communication terminal belong to the same network, and returns the local address of the second communication terminal to the first communication terminal; and upon receiving the local address, the first communication terminal starts communication addressed to the local address.

29. The communication system for communication between a plurality of networks according to claim 18, wherein:

a third NAPT device is additionally provided for connecting from the second local network to the global network, and a fourth communication terminal is additionally provided in the second local network; and each of the communication terminals registers an area ID for uniquely identifying an area which it belongs to when registering itself in the table of the main device.

30. The communication system for communication between a plurality of networks according to claim 29, wherein the main device compares the area IDs when determining whether or not the communication terminals belong to the same network.

31. The communication system for communication between a plurality of networks according to claim 29, wherein the area ID is an ID of the local network which each communication terminal belongs to, or an ID of the global network.

32. The communication system for communication between a plurality of networks according to claim 29, wherein when the third communication terminal sends to the main device a make-call request for making a call to the fourth communication terminal, the main device determines that the third and fourth communication terminals belong to the same area by comparing their area IDs, and the main device uses the local address of the third communication terminal as the source address of the make-call request when creating data to be sent to the fourth communication terminal.

33. The communication system for communication between a plurality of networks according to claim 32, wherein when receiving a response from the fourth communication terminal, the main device uses the local address of the fourth communication terminal as the address of the terminal responding to the communication in the data sent to the third communication terminal.

34. A communication system for communication between a plurality of networks, comprising:
- a first local network having at least two, first and second communication terminals and connected to a first Network Address Port Translation (NAPT) device;
- a second local network having at least one, third communication terminal and connected to a second NAPT device; and
- a global network for connecting the first and second NAPT devices,
- the first and second communication terminals being respectively assigned with first and second local addresses which are effective only in the first local network,
- the third communication terminal being assigned with a third local address which is effective only in the second local network,
- the first and second NAPT devices being respectively assigned with first and second global addresses effective in the global network,
- the communication system further comprising:
- a main device having a table for storing identification information, a local address, and a global address of each of the communication terminals in association with each other, wherein:
- upon receiving a make-call request from the first communication terminal to make a call to the third communication terminal, the main device determines by referring to the table that the first communication terminal and the third communication terminal belong to different networks and uses the global addresses as mutual destination addresses; and
- upon receiving a make-call request from the first communication terminal to make a call to the second communication terminal, the main device determines by referring to the table that the first and second communication terminals belong to the same network and uses the local addresses as mutual destination addresses, wherein:
- a third NAPT device is additionally provided for connecting from the second local network to the global network, and a fourth communication terminal is additionally provided in the second local network; and
- each of the communication terminals registers an area ID for uniquely identifying an area which it belongs to when registering itself in the table of the main device.

35. The communication system for communication between a plurality of networks according to claim 34, wherein the main device is provided in the first local network.

36. The communication system for communication between a plurality of networks according to claim 34, wherein the main device is provided in the global network.

37. The communication system for communication between a plurality of networks according to claim 34, wherein each of the communication terminals preliminarily transmits data relating to the communication terminal to the main device so that the data is registered in the table of the main device.

38. The communication system for communication between a plurality of networks according to claim 37, wherein when receiving a request for registration from a communication terminal, the main device determines whether or not the network corresponding to the address of the communication terminal is the same as the local network which the main device belongs to, and stores the determination result in the table.

39. The communication system for communication between a plurality of networks according to claim 38, wherein when a NAPT device is involved in communication between the main device and the communication terminal, the local address of the source of the data is replaced with the global address of the NAPT device before being transmitted to the main device.

40. The communication system for communication between a plurality of networks according to claim 38, wherein when the third communication terminal registers itself in the table, the main device receives the global address of the second NAPT device and the local address of the third communication terminal, and stores the global address and the local address in the table.

41. The communication system for communication between a plurality of networks according to claim 38, wherein when the first and second communication terminals register themselves in the table, the local addresses of the first and second communication terminals are stored in the table together with the global address of the first NAPT device.

42. The communication system for communication between a plurality of networks according to claim 34, wherein when any of the communication terminals performs direct communication with a remote communication terminal, the communication terminal makes an inquiry about the address of the remote communication terminal directly to the main device.

43. The communication system for communication between a plurality of networks according to claim 42, wherein:
- when the first communication terminal makes an inquiry to the main device about the address of the third communication terminal, the main device determines whether or not the first communication terminal and the third communication terminal belong to the same network, and if it determines that the first communication terminal and the third communication terminal belong to different networks, the main device returns the global address of the third communication terminal to the first communication terminal; and
- upon receiving the global address, the first communication terminal starts communication addressed to the global address.

44. The communication system for communication between a plurality of networks according to claim 42, wherein:
- when the first communication terminal makes an inquiry to the main device about the address of the second communication terminal, the main device determines that the first communication terminal and the second communication terminal belong to the same network, and returns the local address of the second communication terminal to the first communication terminal; and upon receiving the local address, the first communication terminal starts communication addressed to the local address.

45. The communication system for communication between a plurality of networks according to claim 34, wherein the main device compares the area IDs when determining whether or not the communication terminals belong to the same network.

46. The communication system for communication between a plurality of networks according to claim 34, wherein the area ID is an ID of the local network which each communication terminal belongs to, or an ID of the global network.

47. The communication system for communication between a plurality of networks according to claim 34, wherein when the third communication terminal sends to the main device a make-call request for making a call to the fourth communication terminal, the main device determines that the third and fourth communication terminals belong to the same area by comparing their area IDs, and the main device uses the local address of the third communication terminal as the source address of the make-call request when creating data to be sent to the fourth communication terminal.

48. The communication system for communication between a plurality of networks according to claim 47, wherein when receiving a response from the fourth communication terminal, the main device uses the local address of the fourth communication terminal as the address of the terminal responding to the communication in the data sent to the third communication terminal.

* * * * *